Jan. 5, 1932.   C. N. ROUSE, JR   1,839,596
MICROMETER
Filed June 13, 1929
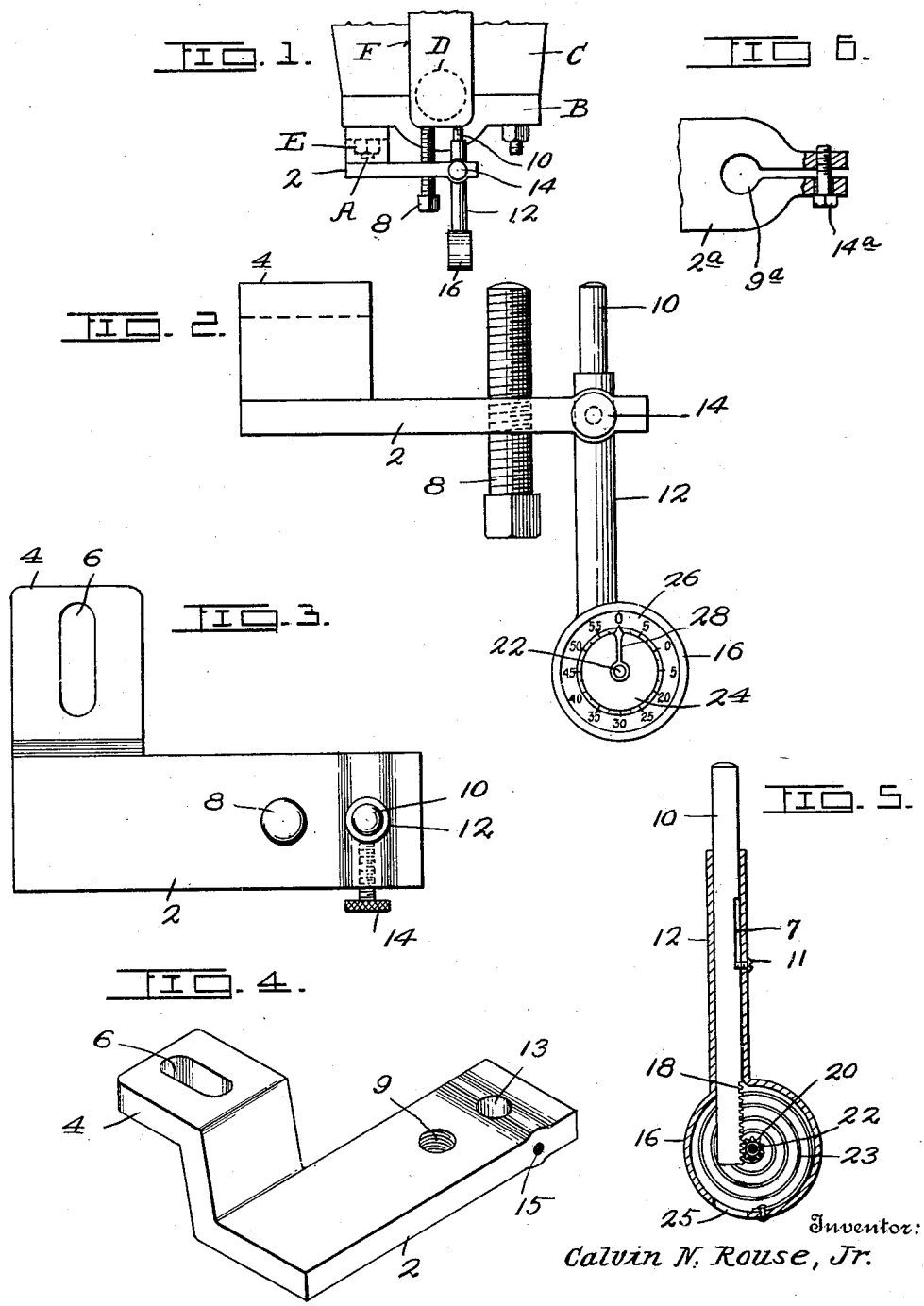
Inventor:
Calvin N. Rouse, Jr.
Witness:
Fred C. Fischer.
By F. G. Fischer,
Attorney Patented Jan. 5, 1932

1,839,596

UNITED STATES PATENT OFFICE

CALVIN N. ROUSE, JR., OF KANSAS CITY, MISSOURI

MICROMETER

Application filed June 13, 1929. Serial No. 370,543.

My invention relates to micrometers for determining the wear on bearings, and while it may be used to advantage for other purposes it is intended more especially for determining the wear on crank shaft bearings of internal combustion engines.

When a knock occurs in an engine due to the worn clearance between the shaft journals and their split-type bearings the wear must be taken up by either removing one or more shims from between the bearing block and the caps, or, if no shims are employed, the meeting faces of the bearing block and the caps must be filed down or otherwise reduced sufficiently to take up the wear.

Often only one bearing of the engine requires adjusting but without an instrument of this character it is almost impossible for the mechanic to distinguish the worn bearing from the others and hence all of the bearing caps and shims may be removed and the bearings tested before the worn bearing is located, thereby resulting in a loss of time and unnecessary expense.

By employing my instrument all of the bearings of the engine may be quickly tested for wear without necessitating the removal of shims or bearing caps and after the worn bearing has been located the amount of wear may be accurately determined to a thousandth of an inch, so that the mechanic may know how many shims to take out or how much of the meeting faces of the bearing block and the cap must be removed.

In order that the invention may be fully understood, reference will now be had to the accompanying drawings in which:

Fig. 1 is a side elevation of the instrument in position for measuring the amount of wear between a journal and its bearing without removal of the bearing cap.

Fig. 2 is a side elevation of the instrument with the indicating means turned at right angles to the position shown by Fig. 1.

Fig. 3 is a plan view of the instrument.

Fig. 4 is a detail perspective of a support whereby the instrument is held in position on the bearing cap while determining the amount of wear.

Fig. 5 is a sectional view of certain parts employed in carrying out the invention.

Fig. 6 is a fragmentary plan view of a modified form of supporting member.

Referring in detail to the different parts, 2 designates a support or bracket which may be made in different shapes and sizes for use on different types of engines. In the present instance said support 2 is provided at one end with a laterally projecting arm 4 having a longitudinal slot 6 for fitting loosely over one of the stud bolts A which hold the cap B on the bearing block C in which the crank shaft D of the engine is mounted.

8 designates a lifting member which is threaded or otherwise adjustably mounted in an aperture 9 in the support 2 for the purpose of raising the crank shaft D in the worn bearing so that the extent of wear may be accurately determined as will hereinafter appear.

10 designates a telescopic slide arranged to move longitudinally in a slide carrier 12 which latter may be either rotated or adjusted longitudinally in an aperture 13 extending through the support 2. Movement of the slide 10 is limited by the ends of a groove 7 in said slide, and a screw 11 threaded in the carrier 12, which latter is secured at any point of its adjustment by suitable means such as a set screw 14 threaded in an aperture 15 located in one side of the support 2 and communicating with the aperture 13.

The lower end of the slide carrier 12 is provided with a circular casing 16 into which the lower end of the telescopic slide 10 extends. The lower portion of the slide 10 is provided with teeth 18 which intermesh with a pinion 20 fixedly mounted upon a shaft 22 which is journaled in the casing 16. A spiral spring 23 secured at one end to the casing 16 and at its opposite end to the shaft 22 rotates the latter in a direction to urge the slide 10 to the end of its upward movement. The lower portion of the casing 16 has an aperture 25 through which the lower end of the slide 10 may pass when said slide is pushed downwardly into the carrier 12 against the action of the spring 23.

The face of the casing 16 is equipped with a dial 24 having an annular scale 26 which may be divided into thousandths of an inch or such other fractions as desired. A hand 28 fixedly mounted upon the forward end of the shaft 22 is provided to cooperate with the scale 26 in determining the amount of wear in the bearings.

In practice when it is desired to test the crank shaft bearings of an internal combustion engine the nut E on one of the stud bolts A is removed and the slotted portion 6 of the support 2 is placed in position over said stud bolt and firmly secured in place with said nut E. During the foregoing operation, care is taken to adjust the lifting member 8 and the telescopic slide 10 beneath the adjacent crank F of the main shaft as shown by Fig. 1. Then while the upper end of the slide 10 is bearing against the crank F the slide carrier 12 is adjusted upwardly to tension the spiral spring 23 and swing the hand 28 to the "0" or zero point on the scale 26. The lifting member 8 is then adjusted upwardly and if there is any wear the crank shaft D is raised until checked by the upper half of the bearing. The slide 10 follows the crank shaft upwardly and the hand 28 moves over the scale 26 and accurately indicates the amount of wear or clearance between the crank shaft journal and its bearing. The other bearings of the engine may then be successively tested in a like manner.

In the modified form shown by Fig. 6, the support 2a has one end split back to the aperture 9a and provided with a screw 14a, for drawing said split end firmly about the carrier 12, so that the set screw 14 may be dispensed with.

From the foregoing description it is apparent that I have provided a micrometer embodying the advantages above pointed out, and while I have shown and described one complete preferred form of the invention and a modified form of the support, I reserve all rights to such other forms and modifications as properly fall within the spirit and scope of the invention as claimed.

Having thus described my invention, what I claim and desire to secure by Letters Patent, is:

1. A micrometer for determining the wear in crank shaft bearings, consisting of a support having a laterally projecting arm adapted to be secured to any of said bearings, means carried by said support for raising the crank shaft to the extent of the wear between the latter and the bearing, and means associated with said support for indicating the extent of the upward movement of said crank shaft.

2. A micrometer for determining the wear in crank shaft bearings, consisting of a support adapted to be secured to any of said bearings, manually controlled threaded means carried by said support for raising the crank shaft to the extent of the wear between the latter and the bearing, and means associated with said support for automatically indicating the extent of the upward movement of said crank shaft.

In testimony whereof I affix my signature.

CALVIN N. ROUSE, Jr.